US012792254B2

(12) United States Patent
Nguyen et al.

(10) Patent No.: US 12,792,254 B2
(45) Date of Patent: Nov. 10, 2026

(54) MODULATION CODE PERMUTATION SELECTION FOR DATA MODULATION IN MEMORY SYSTEMS

(71) Applicant: Micron Technology, Inc., Boise, ID (US)

(72) Inventors: Phong S Nguyen, Livermore, CA (US); Dung Viet Nguyen, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 75 days.

(21) Appl. No.: 18/781,970

(22) Filed: Jul. 23, 2024

(65) Prior Publication Data

US 2025/0103238 A1 Mar. 27, 2025

Related U.S. Application Data

(60) Provisional application No. 63/539,795, filed on Sep. 21, 2023.

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0679; G06F 3/0604; G06F 3/0655
See application file for complete search history.

(56) References Cited

U.S. PATENT DOCUMENTS

| | | | |
|---|---|---|---|
| 8,065,494 B2 | 11/2011 | Yoshida | |
| 10,175,906 B2 | 1/2019 | Muralimanohar et al. | |
| 11,586,385 B1 | 2/2023 | Lercari et al. | |
| 2007/0086260 A1 | 4/2007 | Sinclair | |
| 2008/0158979 A1* | 7/2008 | Kamei ............ | G11C 29/50004 365/185.19 |
| 2009/0132758 A1* | 5/2009 | Jiang .................. | H04L 25/4919 711/E12.001 |

(Continued)

FOREIGN PATENT DOCUMENTS

WO 2013173729 A1 11/2013

OTHER PUBLICATIONS

International Search Report and Written Opinion for International Application No. PCT/US2024/047565, mailed Dec. 24, 2024, 9 Pages.

(Continued)

*Primary Examiner* — Arpan P. Savla
(74) *Attorney, Agent, or Firm* — Lowenstein Sandler LLP

(57) ABSTRACT

Described are systems and methods for selecting a modulation code permutation for data modulation in a memory system. An example memory sub-system comprises a controller managing one or more memory devices. The controller is configured to perform operations including: receiving data to be written to the memory device; selecting, from a set of modulation code permutations for modifying data to be written to the memory device, a modulation code permutation; determining that a cost metric value corresponding to storing data modified by the modulation code permutation on the memory device satisfies a target condition; generating, using the modulation code permutation, modulated data from the data to be written; and storing, on the memory device, the modulated data.

18 Claims, 9 Drawing Sheets

(56) References Cited

U.S. PATENT DOCUMENTS

2009/0132895 A1* 5/2009 Jiang .................... H03M 13/19 714/781
2011/0157992 A1 6/2011 Strasser et al.
2013/0013854 A1 1/2013 Mun et al.
2013/0013870 A1 1/2013 Cronie et al.
2013/0086442 A1 4/2013 Baptist et al.
2013/0254466 A1* 9/2013 Jiang .................. G06F 11/1072 711/103
2013/0268723 A1* 10/2013 Jiang .................. G11C 11/5628 365/185.03
2015/0199267 A1 7/2015 Oh et al.
2015/0324253 A1* 11/2015 Jiang ..................... G11C 29/52 714/768
2016/0299724 A1 10/2016 Vanaraj et al.
2017/0123668 A1 5/2017 Kim et al.
2017/0277433 A1 9/2017 Willcock
2018/0203616 A1 7/2018 Kwon et al.
2019/0258423 A1 8/2019 Rozman et al.
2020/0110714 A1 4/2020 Richter et al.
2020/0194063 A1* 6/2020 El Gamal ........... G11C 11/5642
2020/0264810 A1 8/2020 Ahirwar et al.
2021/0034251 A1 2/2021 Choi et al.
2021/0349656 A1 11/2021 Adler et al.
2021/0382621 A1 12/2021 Muthiah et al.
2022/0189544 A1* 6/2022 Nguyen .............. G11C 11/5642
2022/0405207 A1 12/2022 Haj Aboutalebi et al.
2023/0229342 A1 7/2023 Aiouaz et al.

OTHER PUBLICATIONS

International Search Report and Written Opinion for International Application No. PCT/US2024/047813, mailed Dec. 24, 2024, 9 Pages.

* cited by examiner

MODULATION CODE PERMUTATION SELECTION FOR DATA MODULATION IN MEMORY SYSTEMS

RELATED APPLICATION

This application claims the benefit of U.S. Provisional Application No. 63/539,795, filed Sep. 21, 2023, the entire contents of which are hereby incorporated by reference.

TECHNICAL FIELD

Implementations of the disclosure relate generally to memory sub-systems, and more specifically, to modulation code permutation selection for data modulation in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
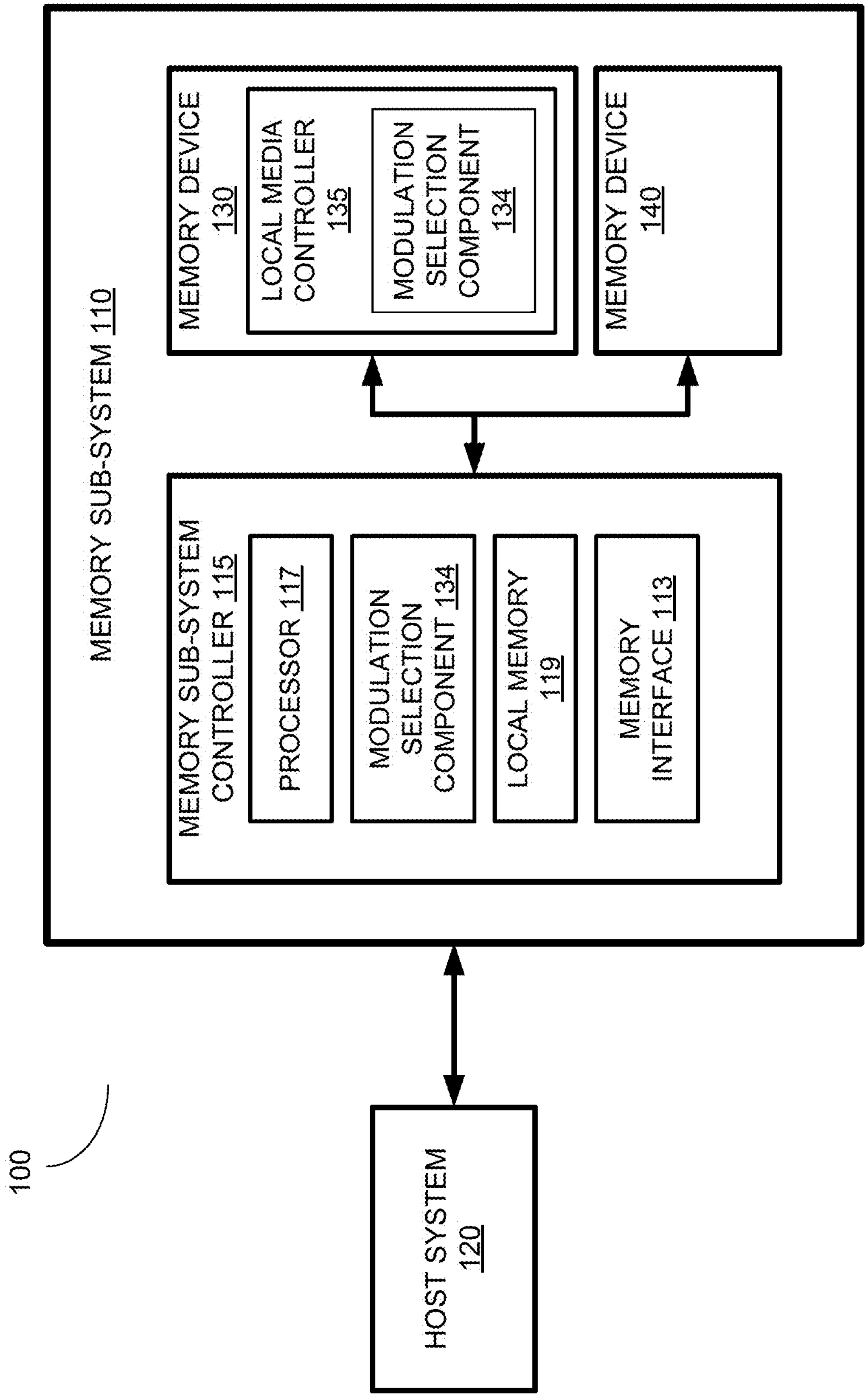
FIG. 1 illustrates an example computing system that includes a memory sub-system in accordance with one or more aspects of the present disclosure.

Aspects of the present disclosure are directed to modulation code permutation selection for data modulation in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some implementations, a memory sub-system can be represented by a solid-state drive (SSD), which can include one or more non-volatile memory devices. In some implementations, the non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. A "block" can refer to a unit of the memory device used to store data and can include a group of memory cells. An example of a "block" is an "erasable block," which is the minimal erasable unit of memory, while "page" is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell can be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Depending on the cell type, each memory cell can store one or more bits of binary information and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells. Each logical level can be translated into a corresponding binary representation of the content of the memory cell. In an illustrative example, a Gray code can be employed for translating the cell charge levels (voltage levels) into their respective binary representations and vice versa. A Gray code refers to an encoding in which adjacent numbers have a single digit different by one.

Memory access operations (e.g., a programming (write) operation, an erase operation, etc.) can be executed with respect to sets of the memory cells, e.g., in response to receiving memory access commands from the host. A memory access operation can specify the requested memory access operation (e.g., write, erase, read, etc.) and a logical address, which the memory sub-system would translate to a physical address identifying a set of memory cells (e.g., a block).

In order to improve endurance of a memory device, the data to be written to the memory device can be modulated to achieve a desired distribution of the charge levels in the memory cells addressable by a given wordline. While a random data pattern encoded by a Gray code would result in uniform distribution of the memory cell charge levels (such that the number of memory cells at an arbitrary chosen charge level being roughly equal to the number of memory cells at any other charge level), employing various non-uniform distributions of memory cell charge levels (i.e., distributions in which the number of memory cells at one charge level can differ by at least a predefined value from the number of memory cells at another charge level) might result in better endurance of the memory device.

For any given data to be written on the memory device, different modulation codes can achieve different distributions of charge levels in the memory cells when the given data is stored on the memory device. For example, a modulation code that causes a certain charge level distribution for a first data can cause a different charge level distribution for a second data. Thus, selecting a single modulation code to achieve a desired distribution of charge levels in the memory cells can be difficult, and can require certain margins of error. However, the process of selecting a modulation code to be applied to each data to be written can be resource intensive, add additional wear to the memory device, and impact memory device performance, including host latency.

Aspects of the present disclosure address the above and other deficiencies by selecting and applying a modulation code to data that causes the data to be written at a desired distribution of charge levels of memory cells of the memory device. Data is received and processing logic selects one or more permutations to apply to the data before the data is stored. The permutation is selected based on a cost metric associated with logical levels of the memory device such that after the data is modulated and stored, the memory cells storing the modulated data will correspond to a non-uniform distribution pattern of logical levels in the frequency domain. In some implementations, a modulation overhead for given modulated data can be appended to the modulated data to facilitate demodulating the data upon receiving a read request. The selection and application of permutations to data results in the data being stored at desired distributions (e.g., uniform, or non-uniform distributions having desired shapes and/or parameters) of charge levels in memory cells addressable by a given wordline, as well as in memory cells addressable by neighboring wordlines of the given wordline.

In an illustrative example, the data to be written on a memory device (e.g., host data) can include one or more pages. A data modulation operation can then be performed on each original segment by combining (e.g., by an exclusive disjunction ("XOR") operation) the original segment with a modulation code (i.e., a sequence of bits). The modulation operation can be identified by a corresponding modulation overhead, which can specify an ordered set of permutations, from which a chosen permutation is performed on the initial (unmodulated) data, a segment size, and a rule to select a permutation for modulating a given data segment, as described in more detail herein below. Each permutation can be identified by a numerical representation by its index (position) within a linear array of permutations, which can be stored in the metadata area of the memory sub-system, thus allowing identification and efficient retrieval of permutations by their respective positions within the linear array. In some implementations, each modulated data segment can include a corresponding modulation overhead identifying the permutation implemented by the modulation operation performed on the corresponding unmodulated data segment. Conversely, the modulate code in associated with the memory device location identifier can be stored, by the modulation operation, in a metadata structure indexed by the location identifiers. Accordingly, the read operation with respect to the modulated data segment would involve the reverse modulation operation with respect to the modulated data, as described in more detail below. Thus, the dynamically configurable modulation scheme implemented in accordance with aspects of the present disclosure results in desired distributions (e.g., uniform, or non-uniform distributions having desired shapes and/or parameters) of charge levels in memory cells addressable by a given wordline.

Various aspects of the methods and systems are described herein by way of examples, rather than by way of limitation. The systems and methods described herein can be implemented by hardware (e.g., general purpose and/or specialized processing devices, and/or other devices and associated circuitry), software (e.g., instructions executable by a processing device), or a combination thereof.

FIG. 1 illustrates an example of a computing system 100 that includes a memory sub-system 110 in accordance with some implementations of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some implementations, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some implementations, each of the memory devices 130 can include one or more arrays of memory cells such as SLCs, MLCs, TLCs, QLCs, or any combination of such. In some implementations, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 ("controller") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 can include memory registers storing memory pointers, fetched data, etc. The local memory 119 can also include read-only memory (ROM) for storing micro-code. While the exemplary memory sub-system in FIG. 1 (e.g., memory sub-system 110) has been illustrated as including the memory sub-system controller 115, in another implementation of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some implementations, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some implementations, memory sub-system 110 is a managed memory device, which includes a raw memory device (e.g., memory device 130) having control logic (e.g., local media controller 135) on the die and a controller (e.g., memory sub-system controller 115) for media management within the same memory device package. An example of a managed memory device is a managed NAND (MNAND) device.

Notably, due to certain physical properties of memory cells of the memory devices 130, certain non-uniform distributions of cell charge levels can result in higher reliability and/or improved endurance of the memory cells, as compared to the reliability and endurance resulting from uniform charge level distributions.

In one implementation, the memory sub-system 110 includes a memory interface 113. Memory interface 113 is responsible for handling interactions of memory sub-system controller 115 with the memory devices of memory sub-system 110, such as memory device 130. For example, memory interface 113 can send memory access commands corresponding to requests received from host system 120 to memory device 130, such as program commands, read commands, or other commands. In addition, memory interface 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In some implementations, the memory sub-system 110 includes a modulation selection component 134, which can select a data modulation code permutation and perform data modulation in order to achieve the desired distributions of the memory cells charges in the memory cells addressable by a given wordline. In some implementations, the modulation selection component 134 can select one or more permutations for performing data modulation on the data segment associated with a given wordline. In an illustrative example, the modulation selection component 134 can modify the data to be written to one or more memory devices 130, e.g., by applying, to the data, one or more modulation operations, such that the modified data, when converted to corresponding voltage levels, would result in the desired distributions of the memory cells charges in the memory cells addressable by a given wordline, as described in more detail herein above.

In an illustrative example, at least part of the functionality of the modulation selection component 134 can be performed by the memory interface 113. In another illustrative example, at least part of the functionality of the modulation selection component 134 can be performed by the local media controller 135. In some implementations, modulation selection component 134 is implemented by firmware, hardware components, or a combination of the above.

In some implementations, the memory sub-system controller 115 can include a processor 117 (processing device) configured to execute instructions stored in local memory 119 for performing the operations described herein.

Figure 2:
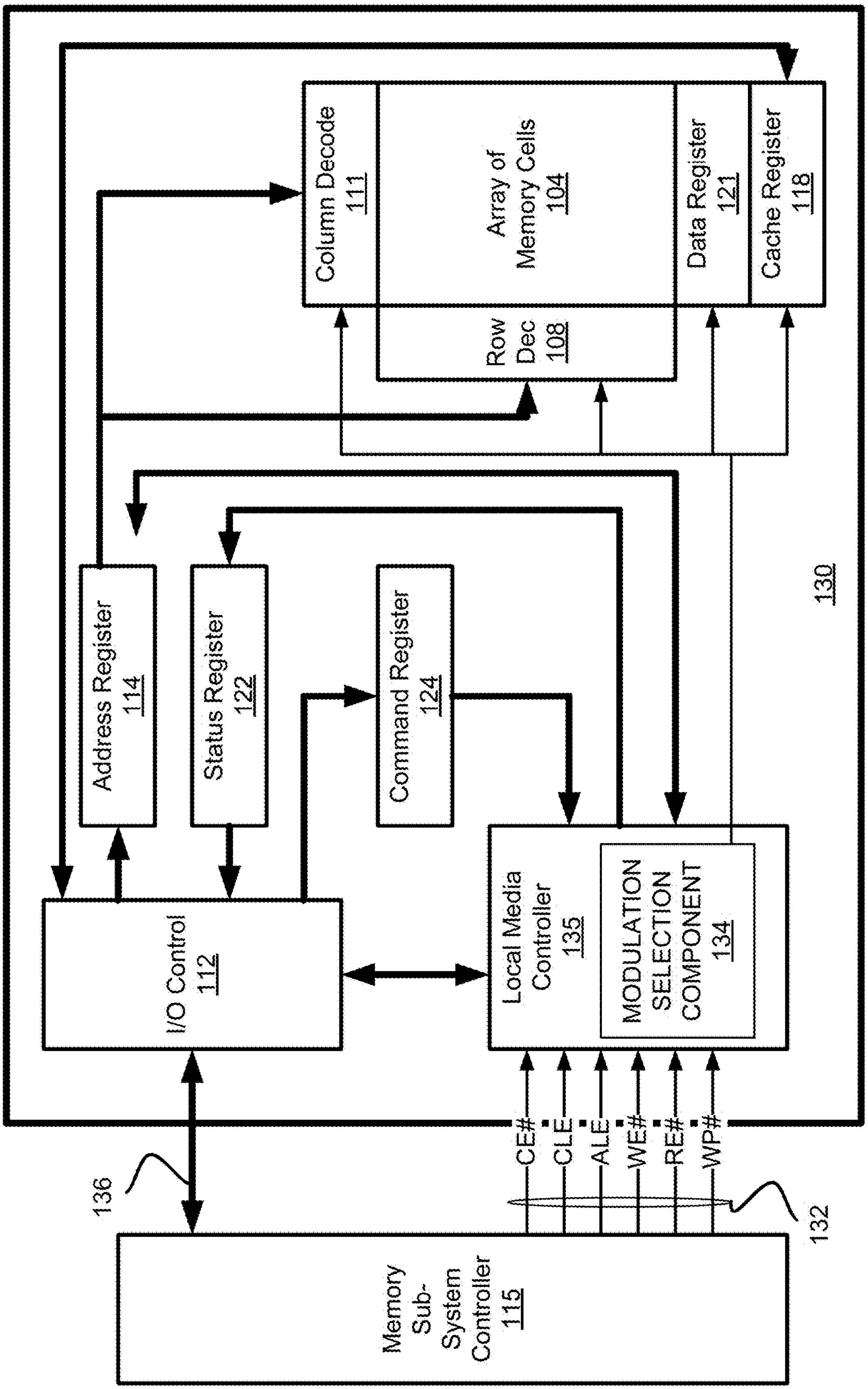
FIG. 2 is a block diagram of a memory device in communication with a memory sub-system controller of a memory sub-system, in accordance with one or more aspects of the present disclosure.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an implementation. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 2) of at least a portion of array of memory cells 104 are capable of being programmed to one of at least two target data states.

Row decode circuitry 108 and column decode circuitry 111 are provided to decode address signals. Address signals are received and decoded to access the array of memory cells 204. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 204. The local media controller 135 can include modulation selection component 134. The local media controller 135 is in communication with row decode circuitry 108 and column decode circuitry 111 to control the row decode circuitry 108 and column decode circuitry 111 in response to the addresses.

The local media controller 135 is also in communication with a cache register 218. Cache register 118 latches data, either incoming or outgoing, as directed by the local media controller 135 to temporarily store data while the array of memory cells 104 is busy writing or reading, respectively, other data. During a programming operation (e.g., a write operation), data can be passed from the cache register 118 to the data register 121 for transfer to the array of memory cells 204; then new data can be latched in the cache register 118 from the I/O control circuitry 212. During a read operation, data can be passed from the cache register 118 to the I/O control circuitry 112 for output to the memory sub-system controller 115; then new data can be passed from the data register 121 to the cache register 218. The cache register 118 and/or the data register 121 can form (e.g., can form a portion of) a page buffer of the memory device 130. A page buffer can further include sensing devices (not shown in FIG. 2) to sense a data state of a memory cell of the array of memory cells 204, e.g., by sensing a state of a data line connected to that memory cell. A status register 122 can be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In some implementations, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands can be received over input/output (I/O) pins [7:0] of I/O bus 136 at I/O control circuitry 112 and can then be written into command register 224. The addresses can be received over input/output (I/O) pins [7:0] of I/O bus 136 at I/O control circuitry 112 and can then be written into address register 214. The data can be received over input/output (I/O) pins [7:0] for an 8-bit device or input/output (I/O) pins [15:0] for a 16-bit device at I/O control circuitry 112 and then can be written into cache register 218. The data can be subsequently written into data register 121 for programming the array of memory cells 204.

In an implementation, cache register 118 can be omitted, and the data can be written directly into data register 220. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

In some implementations, additional circuitry and signals can be provided, and that the memory device 130 of FIG. 2 has been simplified. It should be recognized that the functionality of the various block components described with reference to FIG. 2 can not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) can be used in the various implementations.

As noted herein above, certain non-uniform distributions of cell charge levels can result in higher reliability and/or improved endurance of the memory cells, as compared to the reliability and endurance resulting from uniform charge level distributions.

Figure 3:
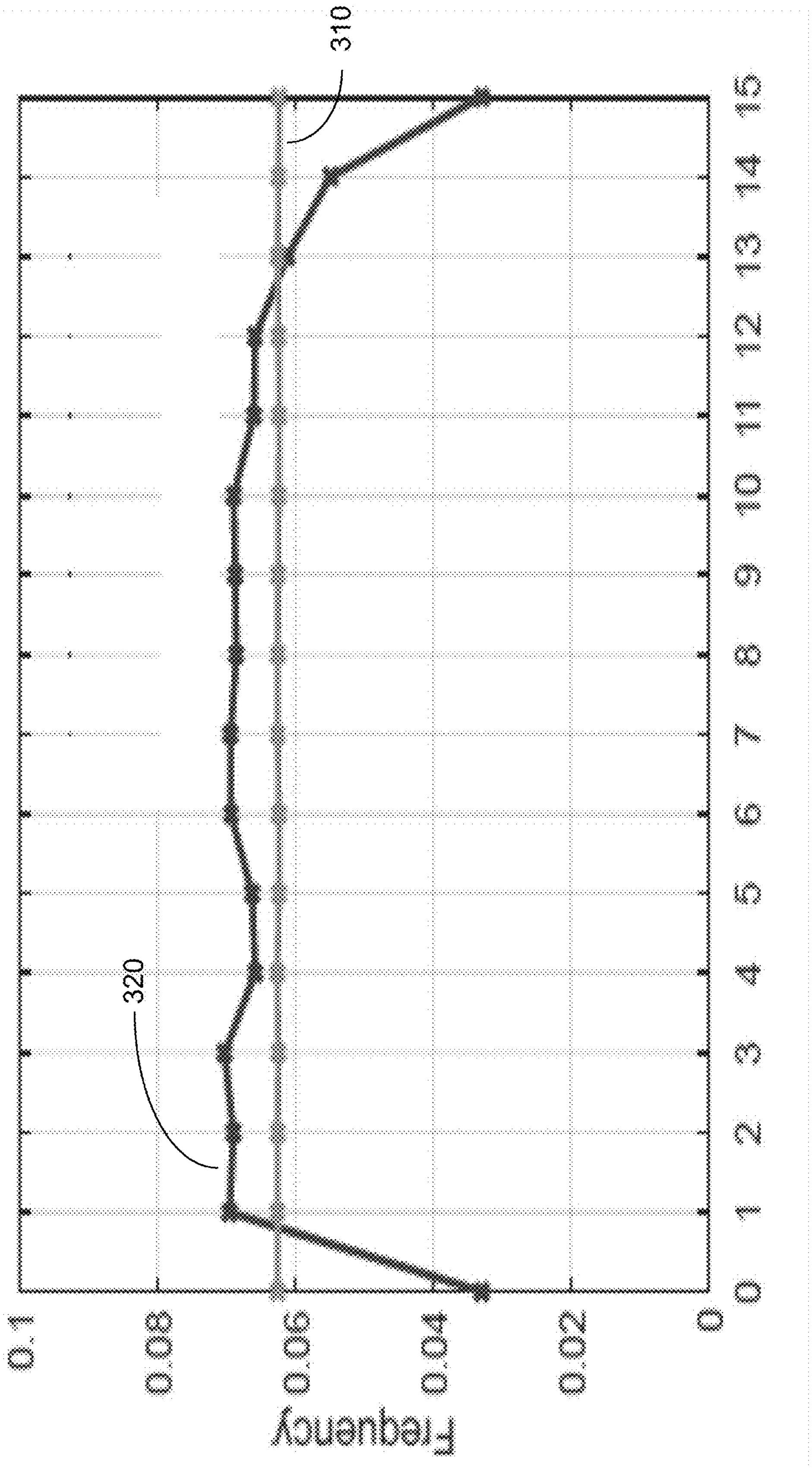
FIG. 3 schematically illustrates charge example distributions of memory cell charge levels, in accordance with aspects of the present disclosure.

FIG. 3 schematically illustrates charge example distributions of memory cell charge levels, in accordance with aspects of the present disclosure. In FIG. 3, plot 320 is an example non-uniform distribution of QLC logical levels over the frequency domain, and plot 310 is an example uniform distribution of QLC logical levels over the frequency domain. As schematically illustrated by FIG. 3, the desired non-uniform distribution of plot 320 for the chosen example wordline can have the inner QLC levels (e.g., 1-14) within a certain frequency range (e.g., between 0.6 and 0.7), while the outer QLC levels (e.g., levels 0 and 15) would fall within a substantially lower range (e.g., between 0.3 and 0.4), such that the center of the frequency range of the outer QLC levels is by at least a predefined value (e.g., 0.3) lower than the center of the frequency range of the inner QLC levels. In some implementations, the desired distribution of the data can be predefined for each location of the memory device based on the characteristic features of the location (e.g., based on the wordline position on a die, such as at the edge of the die or distant from the edge by at least one neighboring wordline). While plot 320 graphically illustrates an example non-uniform distribution of QLC logic levels, other non-uniform distributions are possible for various configurations of logic levels.

Figure 4:
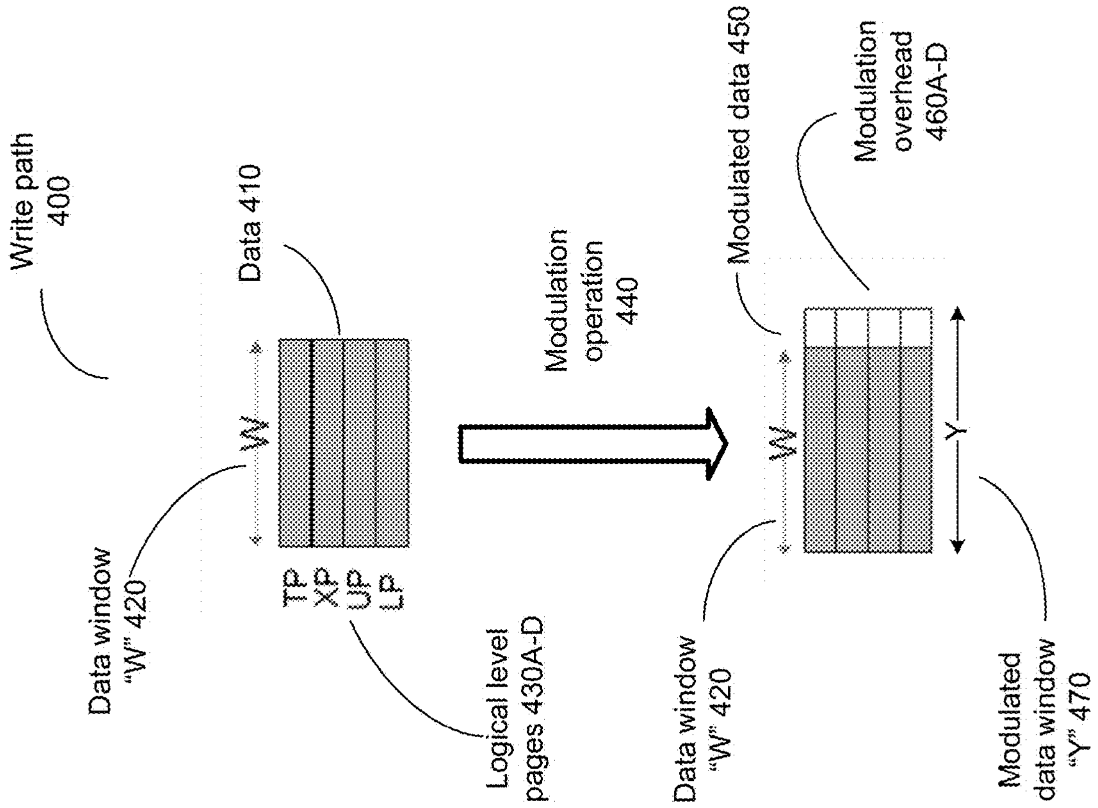
FIG. 4 schematically illustrates an example of a write path with a modulation operation, in accordance with aspects of the present disclosure.

FIG. 4 schematically illustrates an example of a write path with a modulation operation, in accordance with aspects of the present disclosure. The data to be written 410 to a memory device (e.g., host data) can have a data window 420. The size of the data window 420 can correspond to the number of memory cells that will be needed to store a quantity of data. The size of the data window 420 can be a predefined value. For example, if the data to be written 410 requires one hundred memory cells, a data window 420 of a size of 128 memory cells could write all of the data to be written 410 in a single data window 420. However, if given the 100 memory cell requirement and a data window 420 of size 64 memory cells, the data to be written 410 could be split into two data window sizes 420 of 64 memory cells each. In such an example, one or both of the data windows 420 can include memory cells that do not store data from the data to be written 410. In some implementations, each data window 420 can correspond to a unit of data, where the data to be written 410 includes many units of data. In some embodiments, a memory cell count used for a modulation operation can be collected over multiple data windows 420. That is, one or more modulation operations can be applied to multiple data windows 420 as a group of data windows 420 (not illustrated). The data to be written 410 can be represented by one or more logical level pages 430A through logical level pages 430D, e.g., the lower page (LP), the upper page (UP), the extra page (XP), and the top page (TP) for QLC memory.

As noted herein above, data modulation can be performed by applying a modulation operation 440 to the data to be written 410 in order to achieve desired (e.g., predefined) charge level distributions in the memory device. Modulation operation 440 can be performed by combining (e.g., by an exclusive disjunction ("XOR") operation) and data to be written 410 with one or more permutations (i.e., a sequence of bits) represented by a vector $M_X$ of the same size:

$$D_t = D_0 XOR\ M_X$$

where $D_t$ is the transformed (modulated) segment of data and $D_0$ is the original segment of data. Vector $M_X$ can be one of multiple permutation vectors that are stored as metadata in a permutation table. In some implementations, vector $M_X$ can have a predefined value (e.g., sequence of bits).

Modulated data 450 can include appended modulation overhead 460A-D in a modulated data window "Y" 470, as illustrated in FIG. 4. Modulation overhead 460A though modulation overhead 460D identifies one or more permutations that are to be applied to the original segment of data. The size of the permutation is ceil($\log_2$(N) bits, where ceil( ) is a function that returns the smallest integer value that exceeds or is equal to its argument, and Nis the number of permutations in the chosen modulation code. In an illustrative example, the permutation values includes 16 permutations, and the modulation overhead would be $\log_2(16)=4$ bits. While in the illustrative example of FIG. 4 modulation overhead 460A-D are appended to the modulated data 450, in other implementations, modulation overhead 460A-D can be prepended to the modulated data 450, modulation overheads 460A-D can be grouped together and following or preceding a group of corresponding modulated data 450, and so on.

Figure 5:
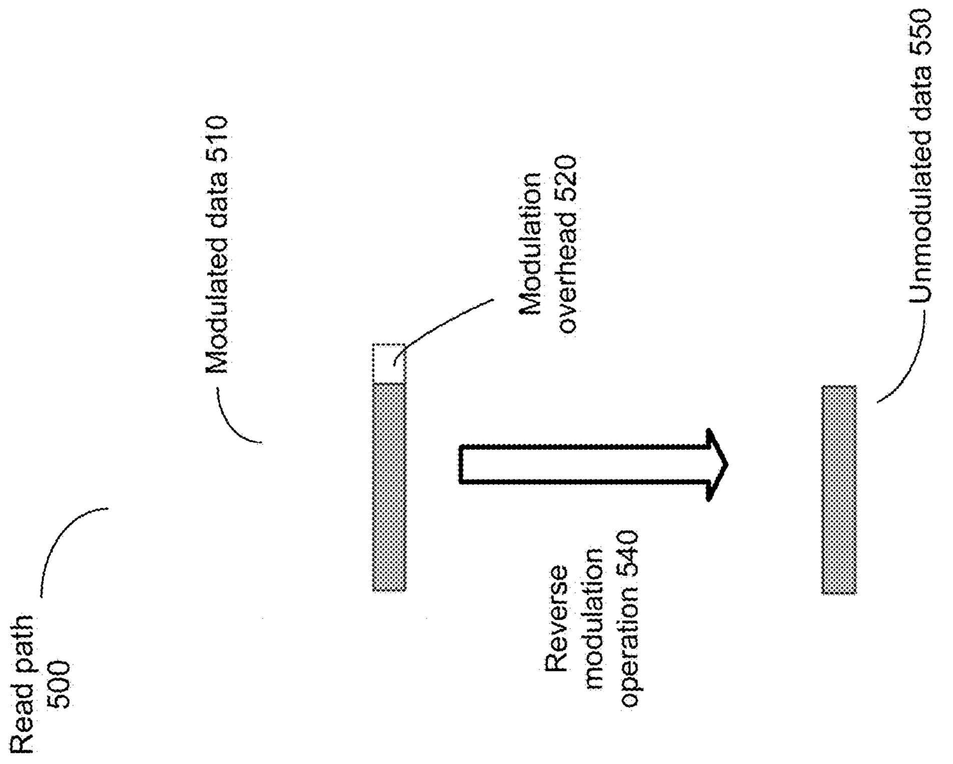
FIG. 5 schematically illustrates an example of a read path with a reverse modulation operation, in accordance with aspects of the present disclosure.

FIG. 5 schematically illustrates an example of a read path 500 with a reverse modulation operation, in accordance with aspects of the present disclosure. A read operation would involve reading, from the memory device, the modulated data 510, including the modulation overhead 520. Processing logic of the memory sub-system can identify the appropriate one or more permutations based on the modulation overhead 520. Processing logic can the apply the reverse modulation operation 540. Reverse modulation operation 540 can be the opposite (e.g., inverse) of modulation operation 440 described with respect to FIG. 4 (e.g., represented as unmodulated data 550). In some implementations, the reverse modulation operation can involve combining (e.g., by an exclusive disjunction ("XOR") operation) each modulated segment of data 460A-460D with the permutation represented by a vector $M_X$ from the set of permutations stored on the memory device in association with the modulated data 510:

$$D_0 = D_t XOR\ M_X.$$

where $D_0$ is the original segment of data, and $D_t$ is the transformed (modulated) segment of data. Vector $M_X$ can be one of multiple permutation vectors that are stored as metadata in a permutation table. In some implementations, vector $M_X$ can be the same vector used to modulate the original segment of data in a write path, such as write path 400 described with respect to FIG. 4.

Figure 6:
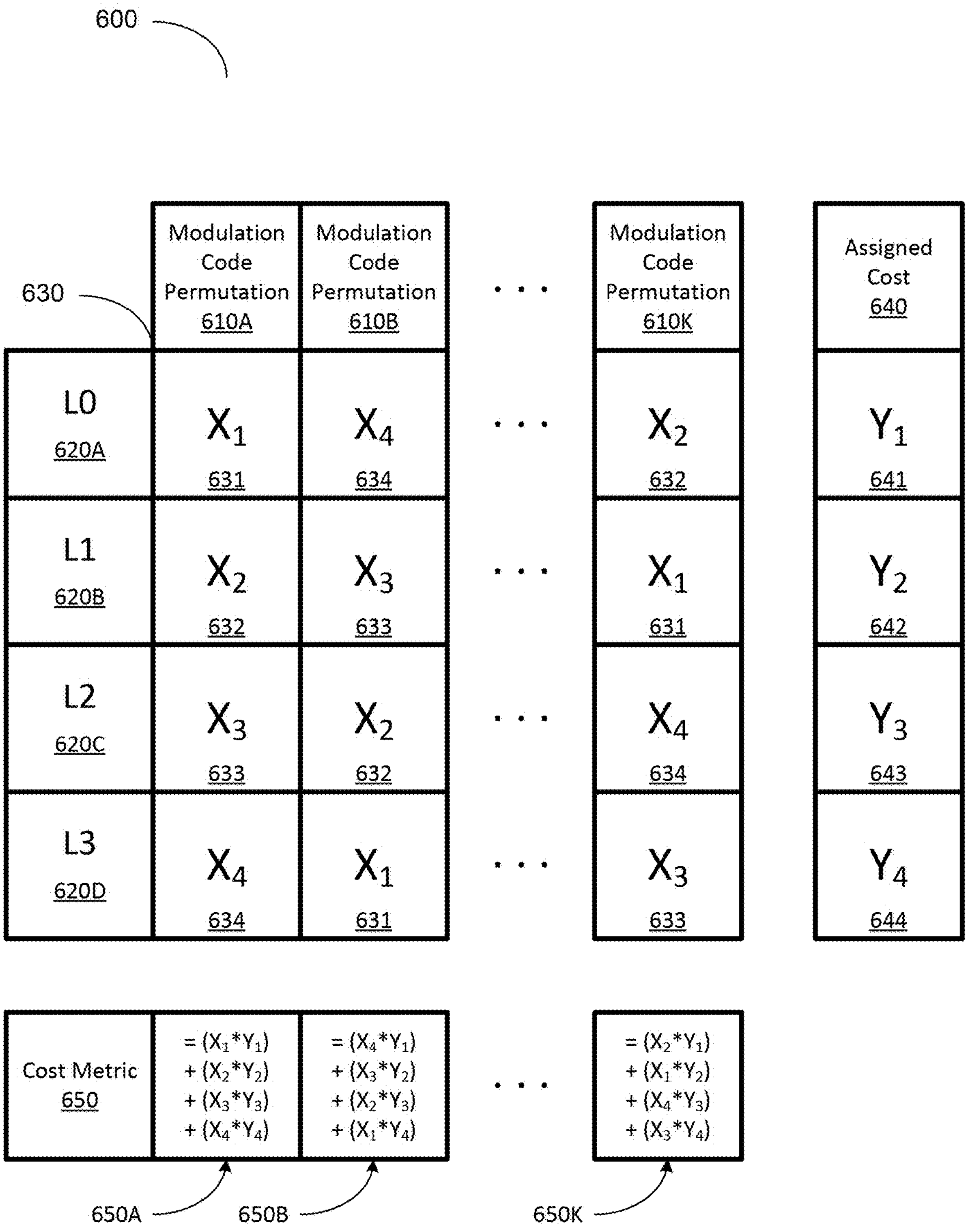
FIG. 6 depicts an example data structure with columns of permutations, and rows of logical levels corresponding to a set of voltage distributions of a memory device, in accordance with aspects of the present disclosure.

FIG. 6 depicts an example data structure 600 with columns of permutations 610, and rows of logical levels 620 corresponding to a set of voltage distributions of a memory device, in accordance with aspects of the present disclosure. As noted herein above, a modulation operation can be applied to each segment of the original translation unit thus producing a corresponding modulated segment. In some implementations, the modulation operation can be identified by a corresponding modulation code, which can specify an ordered set of permutations (e.g., transforming each initial n-tuple of binary values into a corresponding modulated n-tuple of binary values: $\{0,1\}_{INITIAL}^{BPC} \rightarrow \{0,1\}_{MODULATED}^{BPC}$), from which a chosen permutation is performed on the initial (unmodulated) data, a segment size, and a rule to select a permutation for modulating a given data segment.

In various illustrative examples, the segment size can be 128 bytes, 256 bytes, etc. In In an illustrative example, the rule to select a permutation for modulating a given data segment can specify one or more logical programming levels (e.g., chosen from levels L0, . . . , L15 for QLC), such that the modulation operation should minimize the number of memory cells at those programing levels in the modulated data segment. In an illustrative example, the rule to select a permutation for modulating a given data segment can specify target shapes of one or more voltage distributions corresponding to respective logical programming levels, with respect to a chosen distance measure, e.g., L1-norm, L2-norm, Kullback-Leibler distance, etc.

In an illustrative example, the modulation code specifies an ordered subset of permutations $\{0,1\}_{INITIAL}^{BPC} \rightarrow \{0,1\}_{MODULATED}^{BPC}$, the segment size W=128, and the permutation identifying rule selecting a permutation that minimizes the number of memory cells at logical programing level L15 in each data segment.

In some implementations, the modulation code permutation can be chosen based on a metadata structure stored in the metadata area of the memory device. In an illustrative example, the metadata structure can store a set of mappings, each mapping associating, with a corresponding modulation code, a combination of a location identifier (e.g., a wordline number, block number, die identifier, etc.) and a set of operating conditions (e.g., operating temperature of the memory device and/or a value of a memory endurance metric, such as the number of program/erase cycles).

Upon identifying the modulation code permutation, the modulation operation can sequentially apply, to each segment of the original translation unit, the permutations of the ordered permutation set specified by the identified modulation code permutation, and compute the resulting value of the metric utilized by the permutation selection rule (e.g., the number of the memory cells at one or more specified logical programming levels). The permutation operation can then select the permutation that results in the desired optimal (e.g., minimum or maximum) value of the metric.

In some implementations, the modulation code permutation that has been utilized for the translation unit can be stored, by the modulation operation, in another metadata structure stored in the metadata area of the memory device. In an illustrative example, the metadata structure can store a set of mappings, each mapping associating a location identifier (e.g., a wordline number, block number, die identifier, etc.) with a corresponding modulation code permutation.

Conversely, the identifier of the permutation that has been applied to a given data segment (e.g., represented by the ordinal number of the permutation in the ordered set of permutations specified by the corresponding modulation code permutation) constitutes the modulation overhead, which can be stored with the corresponding modulated data segment (e.g., is concatenated with the corresponding modulated data segment), as described in more detail herein below.

Memory cell counts 630 indicate a quantity of memory cells (of data modified by one or more permutations as identified by modulation code permutation 610) with a voltage threshold corresponding to a given logical level 620. In the illustrative example, input data modified by permutation(s) identified by modulation code permutation 610A will result in an $X_1$ 631 quantity of memory cells at logical level L0 620A, an $X_2$ 632 quantity of memory cells at logical level L1 620B, an $X_3$ 633 quantity of memory cells at logical level L2 620C, and an $X_4$ 634 quantity of memory cells at logical level L3 620D. In the illustrative example, input data modified by permutation(s) identified by modulation code permutation 610B will result in an $X_4$ 634 quantity of memory cells at logical level L0 620A, an $X_3$ 633 quantity of memory cells at logical level L1 620B, an $X_2$ 632 quantity of memory cells at logical level L2 620C, and an $X_1$ 631 quantity of memory cells at logical level L3 620D. In the illustrative example, input data modified by permutation(s) identified by modulation code permutation 610K will result in an $X_2$ 632 quantity of memory cells at logical level L0 620A, an $X_1$ 631 quantity of memory cells at logical level L1 620B, an $X_4$ 634 quantity of memory cells at logical level L2 620C, and an $X_3$ 633 quantity of memory cells at logical level L3 620D.

A vector of assigned costs 640 can be a part of data structure 600, or can be a related data structure. The vector of assigned costs 640 can be configured during production of the memory device. Generally, the values of the assigned costs 640 can remain fixed between modulation operations. In some implementations, the vector of assigned costs 640 can be reconfigured by the memory sub-system (such as by memory sub-system controller 115 as described with respect to FIG. 1). In such implementations, the vector of assigned costs can be reconfigured based on memory device operating conditions, such as a number of program/erase cycles a set of memory cells has experienced. In relation to data structure 600, a vector of assigned costs 640 can have a vertical, or "column" orientation (e.g., the same orientation as permutations 610). In the illustrative example, logical level L0 620A has been assigned an assigned cost $Y_1$ 641, logical level L1 620B has been assigned an assigned cost $Y_2$ 642, logical level L2 620C has been assigned an assigned cost $Y_3$ 643, and logical level L3 620D has been assigned an assigned cost $Y_4$ 644.

As described above with respect to FIG. 3, it can be desirable to store data in a non-uniform distribution of logical levels over the frequency domain. An assigned cost 640 can reflect the overhead associated with storing data at a respective logical level. Assigned costs 640 for logical levels with a desired relative lower frequency are larger than assigned costs 640 for logical levels with a desired relative higher frequency. For example, referring to the illustrative example of FIG. 3, an assigned cost for the logical level L0 would be larger than an assigned cost for the logical level L1. Returning to FIG. 6, a vector of assigned costs 640 can represent the inverse of a desired non-uniform distribution of logical levels in the frequency domain. Thus, each assigned cost 640 of the vector of assigned costs is relative to each other assigned cost. In some implementations, a vector of assigned costs 640 can be a normalized vector. In some implementations, the assigned cost 640 for a logical level with the highest frequency in the non-uniform distribution can be assigned a "0" as a lowest boundary for the vector of assigned costs 640. For example, referring to the illustrative example of FIG. 3, L3 has the highest frequency in the plot 320 of the non-uniform distribution of logical levels in the frequency domain, and so an assigned cost for L3 can be "0."

In some implementations, larger assigned costs 640 can be assigned to logical levels 620 that have a larger impact on data retention. For example, in a QLC memory device, logical level L0 and logical level L15 might store data less reliably than logical levels L1-L14, and so a larger value can be used as an assigned cost 640 for those levels. In some implementations, each assigned cost 640 can be represented by one or more bits. Assigned costs 640 with multiple bits can produce more precise cost metrics 650. For example, an assigned cost 640 of "0" or "1" can have a nearly 50% error tolerance, whereas an assigned cost 640 of "00," "01," "10," or "11" can have only a nearly 25% error tolerance.

A vector of cost metrics 650 can be a part of data structure 600, or can be a related data structure. The vector of cost metrics 650 can represent the sum of the output of a bitwise exclusive disjunction operation (exclusive-OR (XOR)), or the output of a vector dot-product operation. For example, a bitwise exclusive disjunction operation can be performed on the vector representing modulated code 610A and the vector of assigned costs 640. Each entry of the resulting output vector can be summed together to generate the respective cost metric 650A. In another example, as illustratively shown, a dot-product operation can be performed on the vector representing modulated code 610 and the vector of assigned costs 640. The resulting value can be the respective cost metric 650A.

In relation to data structure 600, a cost metric 650 vector can have a horizontal, or "row" orientation (e.g., the same orientation as logical levels 620), and represent the output of a vector dot-product operation. In the illustrative example, the vector-dot product represented by the cost metric 650 at each entry is the dot-product of a vector of data modified by permutation(s) identified by modulation code permutation 610A dotted with a vector of the cost metric 650. In some embodiments, a modulation code permutation 610 can be identified by a modulation overhead as described with reference to FIGS. 4-5. Thus, in the illustrative example, cost metric 650A corresponds to the permutation identified by modulation code permutation 610A, cost metric 650B corresponds to the permutation identified by modulation code permutation 610B, and cost metric 650K corresponds to the permutation identified by modulation code permutation 610K. Once cost metrics 650 have been calculated for each modulation code permutation 610, the modulation code permutation 610 corresponding to the lowest cost metric 650 can be selected as the modulation code permutation 610 to store the input data. In some implementations, the modulation code permutation 610 corresponding to the highest cost metric 650 can be selected as the modulation code permutation 610 to store the input data.

Data structure 600 can be populated with memory cell counts 630 by applying permutation(s) identified by modulation code permutation 610 to input data. This approach can consume a high quantity of processing bandwidth. However, as shown in the illustrative example, memory cell counts 630 (e.g., $X_1$ 631, $X_2$ 632, $X_3$ 633, and $X_4$ 634) do not change, but only shift to different logical levels 620 depending on the permutations applied based on the modulation code permutation 610. In some implementations, a memory sub-system might have a data structure resembling the data structure 600, which instead can be used illustratively demonstrate portions of an operation, such as permutation calculations below.

Figure 7A:
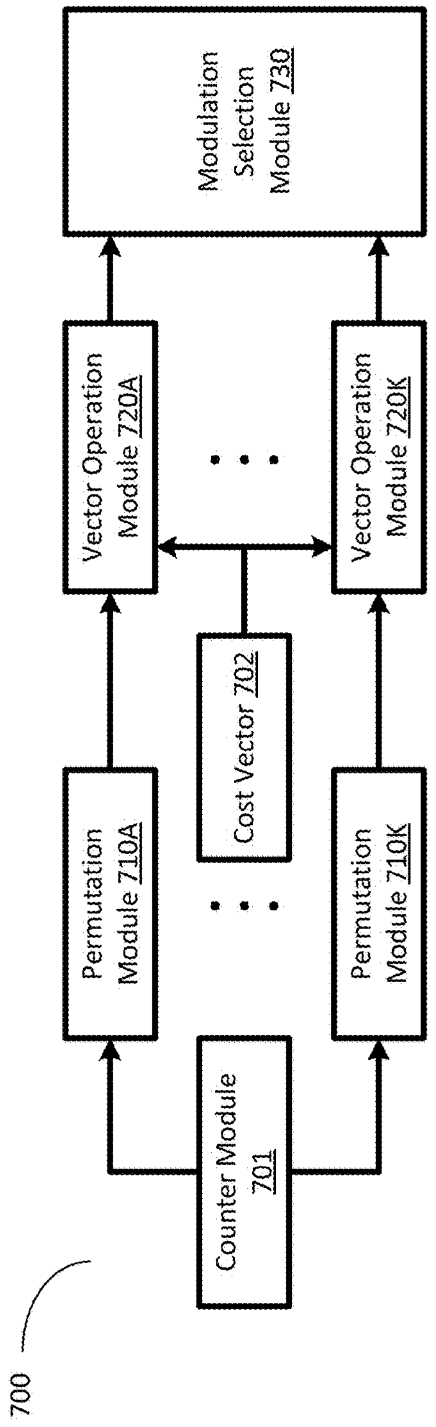
FIGS. 7A and 7B depict example cost metric calculation modules for calculating the cost metric according to the array permutation calculation or the cost permutation calculation respectively, in accordance with aspects of the present disclosure.

In some implementations, data structure 600 does not need to be populated to calculate a vector of cost metrics 650. Instead, the vector of cost metrics 650 can be directly computed using a calculation based on a set of configurable permutations, $\Pi_v$. For example, modulation code permutation 610A can be associated with the identity permutation which maps $\Pi_v(j)=j$ for all levels $j\in\{0, 1, \ldots, 15\}$. Entries $t_j$ in a vector of assigned costs 640, $T=[t_0 \ldots t_{15}]$ can represent the assigned cost 640 for a logical level j (e.g., $Y_1$, $Y_2$, $Y_3$, and $Y_4$). For each incoming data, the respective cost metrics 650 can be calculated by:

$$m_v = \sum_{j=0}^{V-1} c_{\Pi_v(j)} \cdot t_j$$

where $m_v$ is the metric value, v is the number of a respective permutations from an ordered list of the permutations, V is the quantity of permutations, j is the current level, c is the original count (e.g., a memory cell count 630 for a respective level of data modified by a first permutation), $\Pi_v$ is the configurable permutation (based on the selected permutations), and t; is the cost assigned to each level j. FIG. 7A shows an example of a cost metric calculation module 700 which can perform the above calculation. Counter module 701 can determine memory cell counts 630 for incoming data, and send the memory cell counts 630 to permutation modules 710A-K. Permutation modules 710A-K can apply a respective permutation to the memory cell count 630 received as incoming data to generate permutations of the input data. Vector operation modules 720 can accept cost vector 702 and perform a vector operation using the two vectors to generate a cost metric 650 for the respective permutation(s) identified by modulation code permutation 610. In some implementations, the vector operation can be a bitwise exclusive disjunction operation (exclusive-OR (XOR)). In some implementations, the vector operation can be a vector dot-product vector operation. The output of vector operation modules 720 can be sent to modulation selection module 730, which is configured to select a respective permutations based on a cost metric 650 associated with the modulation code permutation 610 that identifies the respective permutation. In some implementations, modulation selection module 730 can select a smallest cost metric 650. In some implementations, modulation selection module 730 can select a largest cost metric 650.

Figure 7B:
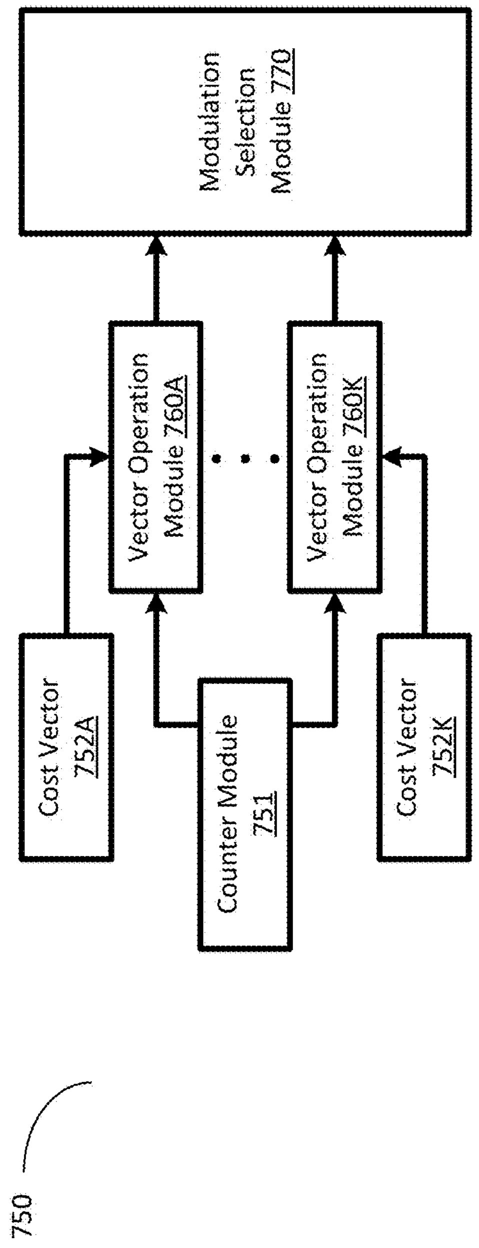

Returning to FIG. 6, in some implementations, the cost metric 650 vector can be directly computed using a calculation based on the vector of assigned costs 640

$$T^{(v)} = \left[t_0^{(v)} \ldots t_{15}^{(v)}\right] \text{ where } t_j^{(v)}$$

is the assigned cost 640 for logical level j. That is, instead of performing a vector operation using permutated vectors of the modulated data and a fixed vector of assigned costs 640, a vector operation is performed using pre-permutated versions ($T^{(v)}$) of the initial vector of assigned costs 640 and a fixed vector of the modulated data. Thus, respective vector operations can be performed without permutating the incoming data (e.g., the vector of modulated data). For each incoming data, the respective cost metrics 650 can be calculated by:

$$m_v = \sum_{j=0}^{V-1} c_j \cdot t_j^{(v)}$$

where $m_v$ is the metric value, v is the number of a respective permutation from an ordered list of the permutations, V is the quantity of permutations, j is the current level, $c_j$ is the original count (e.g., a memory cell count 630 for a respective level of data modified by a first permutation), and $$t_j^{(v)}$$

is the configurable cost assigned to each level j. FIG. 7B shows an example of a cost metric calculation module 750 which can perform the above calculation. Counter module 751 can determine memory cell counts 630 for incoming data, and send the memory cell counts 630 to respective vector operation modules 760. Vector operation modules 760 can also accept respective configurable cost vectors 752 (e.g., permutations of the vector of assigned costs 640) and can perform a vector operation using the two vectors (i.e., the vector of memory cell counts 630 and a permutated vector of the assigned costs 640) for each permutation. In this example, instead of permutating the data from the counter module 751 (e.g., with a permutation module 710), each cost vector 752 can a permutation of other cost vectors 752. In some implementations, the vector operation is a bitwise exclusive disjunction operation (exclusive-OR (XOR)). In some implementations, the vector operation is a vector dot-product vector operation. The output of vector operation modules 760 can be sent to modulation selection module 770, which is configured to select a respective permutation based on a cost metric 650 associated with the permutation(s) identified by a respective modulation code permutation 610. In some implementations, modulation selection module 770 can select a smallest cost metric 650. In some implementations, modulation selection module 770 can select a largest cost metric 650.

Figure 8:
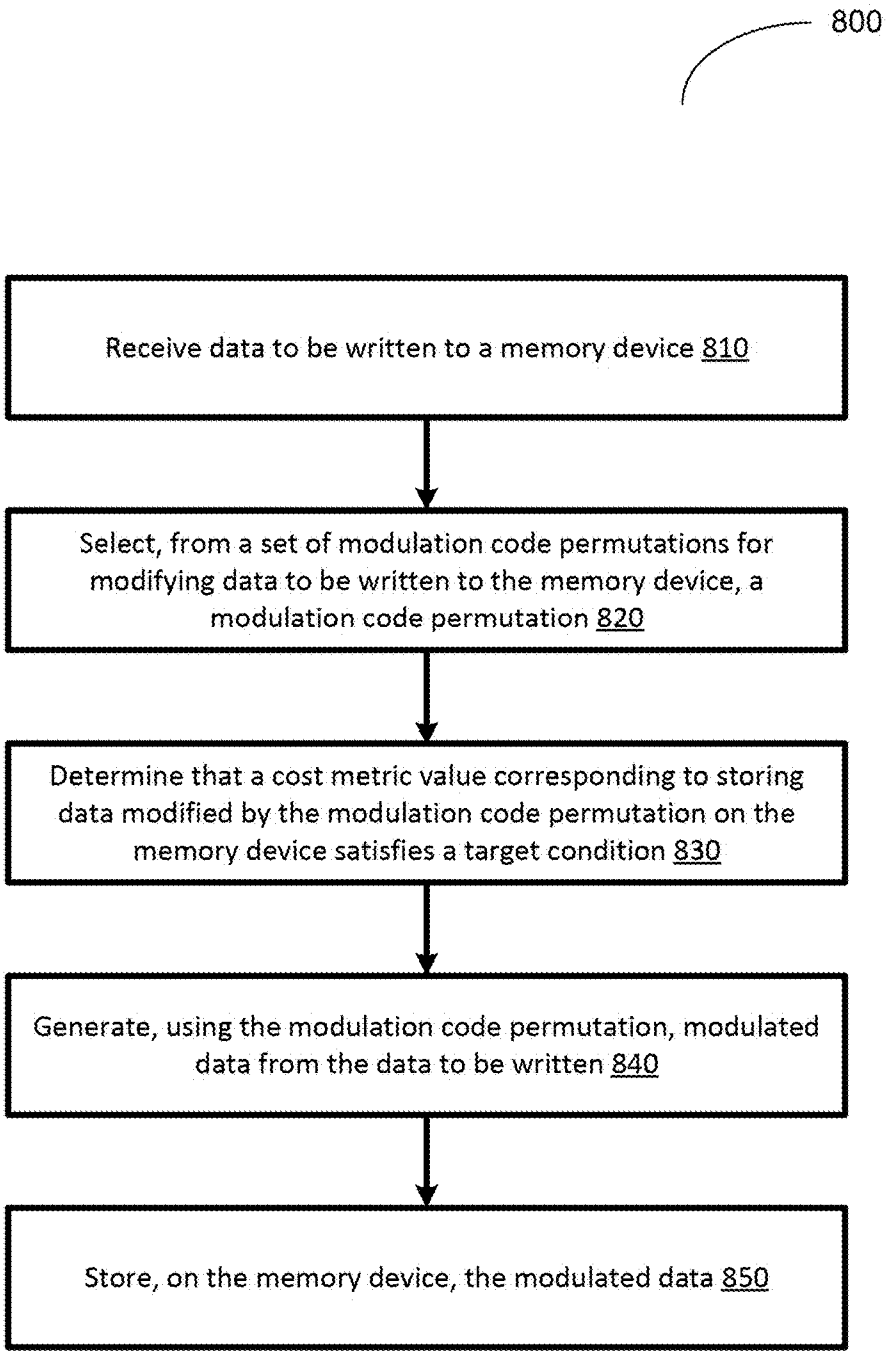
FIG. 8 schematically illustrates an example method of data modulation implemented by a memory controller operating in accordance with aspects of the present disclosure.

FIG. 8 schematically illustrates an example of a method 800 of data modulation implemented by a memory controller operating in accordance with aspects of the present disclosure. The method 800 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 800 can be performed by a single processing thread. Alternatively, method 800 can be performed by two or more processing threads, each thread executing one or more individual functions, routines, subroutines, or operations of the method. In an illustrative example, the processing threads implementing the method 800 can be synchronized (e.g., using semaphores, critical sections, and/or other thread synchronization mechanisms).

Alternatively, the processing threads implementing the method 800 can be executed asynchronously with respect to each other. In some implementations, the method 800 is performed by the memory sub-system controller 115 and/or the local media controller 135 of FIG. 1. Operations of the method 800 can be specified by a sequence of command codes, which the processing logic can retrieve from a dedicated storage location. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various implementations. Thus, not all operations are required in every implementation.

As schematically illustrated by FIG. 8, at operation 810, the processing device implementing the method (e.g., a memory sub-system controller) receives data (e.g., a data unit such as a page) to be written to the memory device.

At operation 820, the processing device selects, from a set of modulation codes for modifying data to be written to the memory device, a modulation code. The modulation code can include one or more permutations. In some implementations, the processing device can select, from a set of modulation code permutations, a modulation code permutation. In some implementations, processing device can determine a modulation overhead that identifies one or more permutations of the modulation code, and append the modulation overhead to the modulated data. In some implementations, the modulation identifier can be connected to the modulated data in another way, for example, the modulation identifier can be prepended to the modulated data. In some implementations, the data to be written can include one or more units of data. Each unit of data can correspond to a quantity of memory cells of the memory device. For example, each unit of data can have the same quantity of memory cells, such as 64 memory cells, or 128 memory cells. In some implementations, each unit of data can correspond to a quantity of memory cells of the memory device required to store a certain quantity of bits, for example, the quantity of memory cells of the memory device needed to store 64 bits or 128 bits.

At operation 830, the processing device determines that a cost metric value corresponding to storing data modified by the modulation code permutation on the memory device satisfies a target condition. In some implementations, the processing device can determine a first cost metric value that corresponds to a first modulation code of the set of modulation codes. The processing device can determine a second cost metric value that corresponds to a second modulation code of the set of modulation codes. In some embodiments, the processing device can determine the second cost metric value that corresponds to a second modulation code permutation of the set of modulation code permutations. The processing device can select, from the first cost metric value and the second cost metric value, the cost metric value that is closest to the target condition. In some implementations, to determine the first cost metric value, the processing device can generate first modulated data from the data to be written and the first modulation code. To determine the second cost metric value, the processing device can generate second modulated data from the data to be written and the second modulation code. In some implementations, to determine the first cost metric value, the processing device can determine, based on the first modulated data, a quantity of memory cells associated with each respective logical level of the memory device. The processing device can identify an assigned cost corresponding to each respective logical level. The first cost metric value can be calculated based on the quantity of memory cells and assigned cost associated with each respective logical level.

At operation 840, the processing device generates, using the modulation code, modulated data from the data to be written. In an illustrative example, the modulation operation involves combining (e.g., by a bitwise exclusive disjunction ("XOR") operation) an original segment of data with the one or more permutations identified by the modulation code. Each permutation can be represented by a vector (i.e., a sequence of bits of a specified size). The permutation defining a modulating transformation that would result in the desired charge level distribution of the modulated data can be chosen, e.g., from a predefined set of permutations. A given permutation can be identified by its index (position) within a linear array of permutations that can be stored in the metadata area of the memory sub-system, as described in more detail herein above. Each modulation overhead references one or more permutations that have been used for modulating a respective original unit of data. In an illustrative example, each modulated data can be concatenated with the corresponding modulation overhead.

At operation 850, the processing device stores, on the memory device, the modulated data, and the method terminates.

Figure 9:
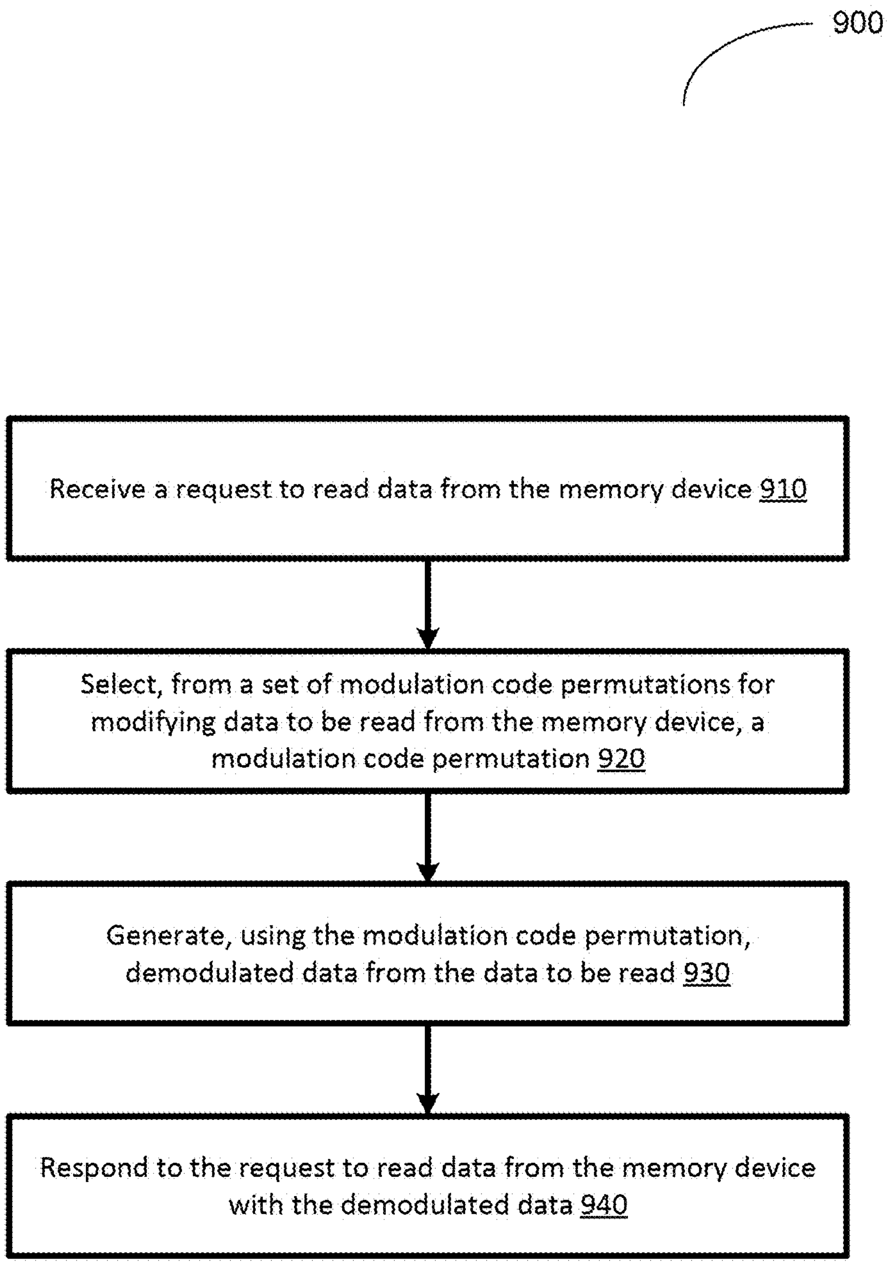
FIG. 9 schematically illustrates an example method of data demodulation implemented by a memory controller operating in accordance with aspects of the present disclosure.

FIG. 9 schematically illustrates an example of a method 900 of data demodulation implemented by a memory controller operating in accordance with aspects of the present disclosure. The method 900 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 900 can be performed by a single processing thread. Alternatively, method 900 can be performed by two or more processing threads, each thread executing one or more individual functions, routines, subroutines, or operations of the method. In an illustrative example, the processing threads implementing the method 900 can be synchronized (e.g., using semaphores, critical sections, and/or other thread synchronization mechanisms). Alternatively, the processing threads implementing the method 900 can be executed asynchronously with respect to each other. In some implementations, the method 900 is performed by the memory sub-system controller 115 and/or the local media controller 135 of FIG. 1. Operations of the method 900 can be specified by a sequence of command codes, which the processing logic can retrieve from a dedicated storage location. Although shown in a particular sequence or order, unless otherwise specified, the order of the operations can be modified. Thus, the illustrated implementations should be understood only as examples, and the illustrated operations can be performed in a different order, and some operations can be performed in parallel. Additionally, one or more operations can be omitted in various implementations. Thus, not all operations are required in every implementation.

As schematically illustrated by FIG. 9, at operation 910, the processing device implementing the method (e.g., a memory sub-system controller) receives a request to read data (e.g., a data unit such as a page) from the memory device.

At operation 920, the processing device selects, from a set of modulation codes for modifying data to be read from the memory device, a modulation code. In some embodiments, the processing device selects from a set of modulation code permutations, a modulation code permutation. Modulation codes can include one or more permutations to be applied to data. In some implementations, processing device can identify a modulation code based on a modulation overhead that is appended to the modulated data. The modulation overhead can identify one or more permutations that have been applied to the modulated data.

At operation 930, the processing device generates, using the permutations of the modulation code, demodulated data from the data to be read. In an illustrative example, the modulation operation involves combining (e.g., by an exclusive disjunction ("XOR") operation) modified data with one or more permutations identified by the modulation overhead. Each permutation can be represented by a vector (i.e., a sequence of bits of a specified size). A given permutation can be identified by its index (position) within a linear array of permutations that can be stored in the metadata area of the memory sub-system, as described in more detail herein above. Each modulation overhead references a respective permutation that has been used for modulating a respective original unit of data. The modulation overhead can be removed before the modulated data is demodulated.

At operation 940, the processing device respond to the request to read data from the memory device with the demodulated data, and the method terminates.

Figure 10:
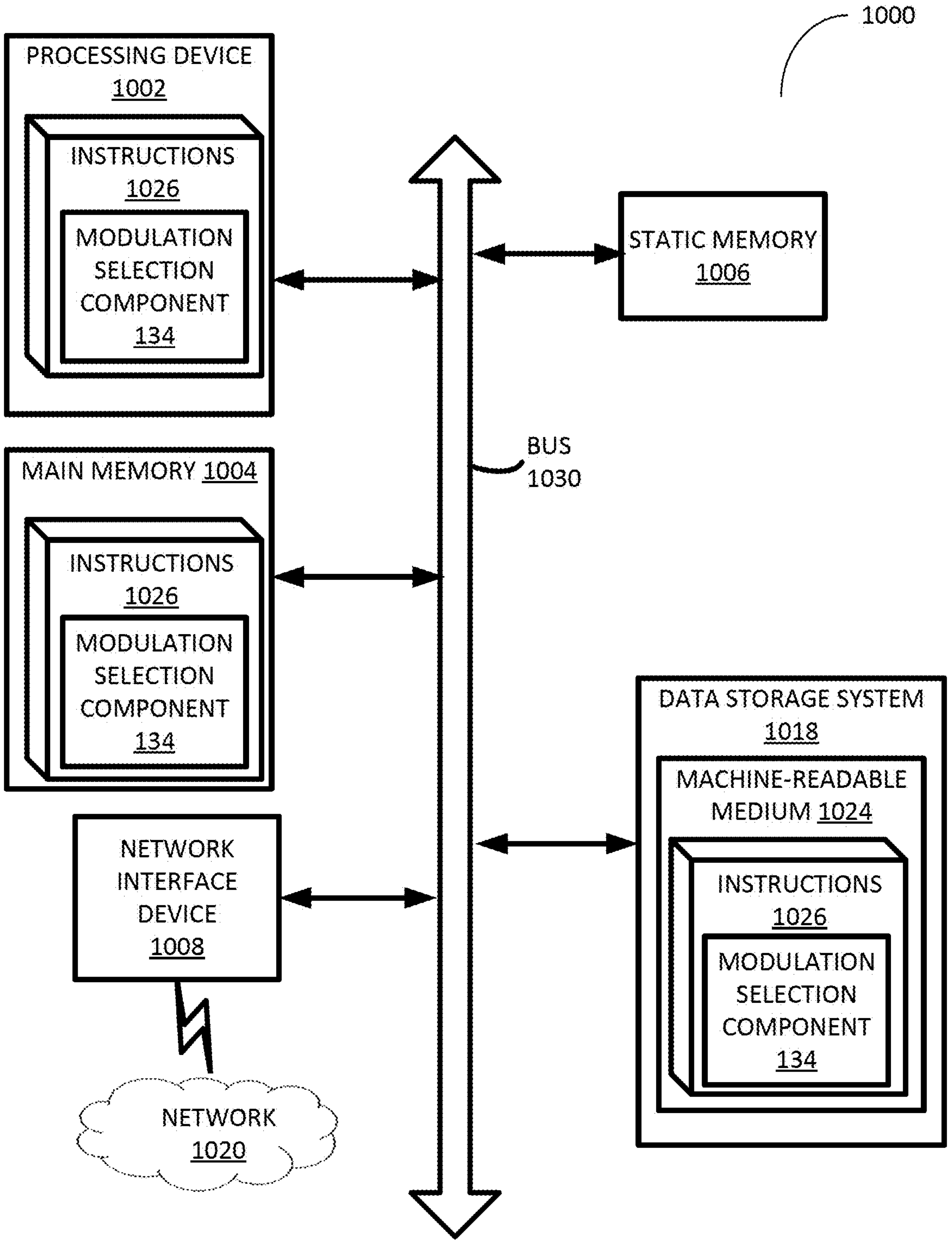
FIG. 10 illustrates an example machine of a computer system within which a set of instructions, for causing the machine to perform any one or more of the methodologies discussed herein, can be executed.

FIG. 10 illustrates an example machine of a computer system 1000 within which a set of instructions, for causing the machine to perform any one or more of the methodologies discussed herein, can be executed. In some implementations, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to perform operations corresponding to modulation selection component 134 of FIG. 1, including method 800 of data modulation and/or method 900 of data demodulation). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein. The computer system 1000 can further include a network interface device 1008 to communicate over the network 1020.

The data storage system 1018 can include a machine-readable storage medium 1024 (also known as a computer-readable medium, such as a non-transitory computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to the memory sub-system 110 of FIG. 1.

In some implementations, the instructions 1026 include instructions to implement functionality corresponding to modulation selection component 134 of FIG. 1, including method 800 of data modulation and/or method 900 of data demodulation. While the machine-readable storage medium 1024 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

All of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

receiving first data to be written to the memory device;

selecting, from a set of modulation code permutations for modifying the first data, a first modulation code permutation and a second modulation code permutation;

generating first modulated data from the first data using the first modulation code permutation and second modulated data from the first data using the second modulation code permutation;

determining that a first cost metric value corresponding to storing the first modulated data on the memory device is closer to a target value than a second cost metric value corresponding to storing the second modulated data on the memory device;

and storing the first modulated data on the memory device.

2. The system of claim 1, wherein determining the first cost metric value comprises:

determining, based on the first modulated data, a quantity of memory cells associated with each respective logical level of a plurality of logical levels of the memory device;

identifying an assigned cost corresponding to each respective logical level; and calculating the first cost metric value based on the quantity of memory cells and assigned cost associated with each respective logical level.

3. The system of claim 1, wherein the first data comprises one or more units of data, wherein each unit of data corresponds to a quantity of memory cells of the memory device.

4. The system of claim 1, wherein generating the first modulated data comprises performing a bitwise exclusive disjunction operation on the first data and the first modulation code permutation.

5. The system of claim 1, wherein the operations further comprise:

determining a first modulation overhead identifying the first modulation code permutation; and appending the first modulation overhead to the first modulated data.

6. The system of claim 1, wherein the operations further comprise:

reading the first modulated data;

determining the first modulation code permutation associated with the first modulated data; and demodulating the first modulated data by a reverse modulation operation using the first modulation code permutation.

7. A method comprising:

receiving first data to be written to a memory device;

selecting, from a set of modulation code permutations for modifying the first data, a first modulation code permutation, and a second modulation code permutation;

generating first modulated data from the first data using the first modulation code permutation and second modulated data from the first data using the second modulation code permutation;

determining that a first cost metric value corresponding to storing the first modulated data on the memory device is closer to a target value than a second cost metric value corresponding to storing the second modulated data on the memory device;

and storing the first modulated data on the memory device.

8. The method of claim 7, wherein determining the first cost metric value comprises:

determining, based on the first modulated data, a quantity of memory cells that associated with each respective logical level of a plurality of logical levels of the memory device;

identifying an assigned cost corresponding to each respective logical level; and calculating the first cost metric value based on the quantity of memory cells and assigned cost associated with each respective logical level.

9. The method of claim 7, wherein the first data comprises one or more units of data, wherein each unit of data corresponds to a quantity of memory cells of the memory device.

10. The method of claim 7, wherein generating the first modulated data comprises performing a bitwise exclusive disjunction operation on the first data and the first modulation code permutation.

11. The method of claim 7, further comprising:

determining a first modulation overhead identifying the first modulation code permutation; and appending the first modulation overhead to the first modulated data.

12. The method of claim 7, further comprising:

reading the first modulated data;

determining the first modulation code permutation associated with the first modulated data; and demodulating the first modulated data by a reverse modulation operation using the first modulation code permutation.

13. A non-transitory computer-readable storage medium comprising instructions that, when executed by a processing device, cause the processing device to perform operations comprising:

receiving first data to be written to a memory device;

selecting, from a set of modulation code permutations for modifying the first data, a first modulation code permutation, and a second modulation code permutation;

generating first modulated data from the first data using the first modulation code permutation and second modulated data from the first data using the second modulation code permutation;

determining that a first cost metric value corresponding to storing the first modulated data on the memory device is closer to a target value than a second cost metric value corresponding to storing the second modulated data on the memory device; and storing the first modulated data on the memory device.

14. The non-transitory computer-readable storage medium of claim 13, wherein determining the first cost metric value comprises:

determining, based on the modulated data, a quantity of memory cells that associated with each respective logical level of a plurality of logical levels of the memory device;

identifying an assigned cost corresponding to each respective logical level; and calculating the first cost metric value based on the quantity of memory cells and assigned cost associated with each respective logical level.

15. The non-transitory computer-readable storage medium of claim 13, wherein the first data comprises one or more units of data, wherein each unit of data corresponds to a quantity of memory cells of the memory device.

16. The non-transitory computer-readable storage medium of claim 13, wherein generating the first modulated data from the first data comprises performing a bitwise exclusive disjunction operation on the first data and the first modulation code permutation.

17. The non-transitory computer-readable storage medium of claim 13, further comprising:

determining a first modulation overhead identifying the first modulation code permutation; and appending the first modulation overhead to the first modulated data.

18. The non-transitory computer-readable storage medium of claim 13, further comprising:

reading the first modulated data;

determining the first modulation code permutation associated with the first modulated data; and demodulating the first modulated data by a reverse modulation operation using the first modulation code permutation.

* * * * *